United States Patent [19]
Choi et al.

[11] Patent Number: 5,693,744
[45] Date of Patent: Dec. 2, 1997

[54] AMORPHUS POLYAMIDES HAVING SECOND ORDER NONLINEAR OPTICAL PROPERTY, AND METHOD FOR PREPARING THEM

[75] Inventors: Kil Yeong Choi; Moon Young Jin; Young Wun Kim, all of Daejeon, Rep. of Korea

[73] Assignee: Korea Research Institute of Chemical Technology, Daejeon, Rep. of Korea

[21] Appl. No.: 492,988

[22] Filed: Jun. 21, 1995

[30] Foreign Application Priority Data

Aug. 4, 1994 [KR] Rep. of Korea ............... 1994-19599

[51] Int. Cl.⁶ .................... C08G 69/08; C08G 73/10
[52] U.S. Cl. .................... 528/310; 528/313; 528/332; 528/335; 528/337; 528/345; 526/311; 526/312
[58] Field of Search ..................... 528/337, 335, 528/345, 310, 313, 332; 526/311, 312

[56] References Cited

U.S. PATENT DOCUMENTS 4,808,332  2/1989  DeMartino ............................ 526/312

OTHER PUBLICATIONS

Burland, D.M.et al. "Second Order Nonlinearity..."Chem. Rev. 1994, 94, 31–75.
Williams, D.J. "Organic Polymeric..."Angew. Chem. Int. Ed. Engl. 23 (1984) 690–703.

*Primary Examiner*—P. Hampton Hightower
*Attorney, Agent, or Firm*—Ladas & Parry

[57] ABSTRACT

An amorphous polyamide represented by the formula(2)

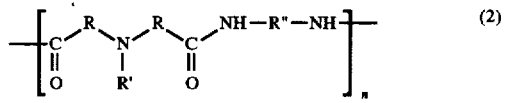

in which each R is at least one alkylene radical having 1 to 10 carbon atoms, R' is an electron acceptor group represented by the formula(3),

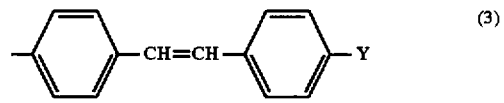

wherein Y is $-C\equiv N$, $-NO_2$, $-SO_2-R(R=C_nH_{2n+1}$, n=1 to 20 alkyl derivatives),

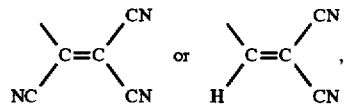

R" is at least one aliphatic or aromatic divalent group having 2 to 20 carbon atoms, and n is an integer of more than 3, having second order nonlinear optical property, and a method for preparing the polymer by the polycondensation of dicarboxylic acid derivative, having second order nonlinear optical property in its side chain, with diamine are disclosed.

5 Claims, No Drawings

AMORPHUS POLYAMIDES HAVING SECOND ORDER NONLINEAR OPTICAL PROPERTY, AND METHOD FOR PREPARING THEM

The present invention relates to amorphous polyamides having second order nonlinear optical property, and to a method for preparing them. More particularly, it relates to amorphous polyamides prepared by the polycondensation of diamines with dicarboxylic acid derivative having second order nonlinear optical active groups in its side chain, and to a method for preparing them.

BACKGROUND OF THE INVENTION

It is well known that organic materials having delocalized π electron generally have nonlinear optical properties. In particular, in order to show nonlinear optical property, it is advantageous that microscopically, electron donor and electron acceptor are placed in a same molecule, as shown in "Angew. Chem. Int. Ed. Engl.23(1984) 690–703 pp", and π-electron has delocalized by conjugation in order to maximize its polarizability. Macroscopically, it is required that these molecules should be noncentrosymmetric in order to show second harmonic generation (hereinafter referred to as SHG) phenomena. Such organic materials have higher resistance to laser, more rapid respondence to light and higher SHG responces as compared with inorganic materials, for example inorganic single crystals, such as quartz, $LiNbO_3$ and InSb, and thus many researches have been devoted to those materials. Particularly, numerous studies have been reported on organic single crystals having noncentrosymmetrical structure wherein molecular polarity in crystal lattice is polarized in a specific direction. However, it is very difficult to give noncentrosymmetricity into crystal structure since noncentrosymmetrical structure of crystal is determined by packing of molecules. Even if single crystals having such crystal structure are prepared, such single crystals have problems in that they have to be processed again in a specific crystal orientation suitable for optical property, and it is not easy to grow crystal in a sufficient size suitable for processing. Moreover, such organic single crystals have poor property in mechanical, thermal and environmental resistance, for example they are brittle to physical impact.

An example of the methods for controlling optionally noncentrosymmetrical structure is the use of "Langmuir Blogett film". This film can be produced as very thin film having noncentrosymmetrical structure depending on method for preparing it and molecular structure. However, the preparation of polarized multi-layered LB film having high SHG property is very tedious since the method of preparing LB film includes laminating method of layer at a molecular level. Moreover, the process of preparing LB film is so complicated and mechanical strength of LB film is so weak that it can not be applied to photomodulator or photoswitch,, Therefore, LB film is impractical.

It is well known that polymeric materials can be patterned and multi-layered by lithographic technique in semiconductor industry. In addition to above mentioned processability, the second order nonlinear optical polymer have several advantages in that they had mechanical strength, low electrical conductivity, heat resistance and thin film forming property higher than those of the above mentioned organic and inorganic single crystal. Unlike noncentrosymmetric single crystal structure or special molecular structure are required for LB film, polymeric materials can be provided to a noncentrosymmetricity by electrical poling process which induces SHG compulsorily. Therefore, polymers having second order nonlinear optical property have advantageous in that many choices on molecular design and their preparation are available, and thereby physical property and processing condition can be freely controlled.

Nonlinear optical materials using polymers can be largely divided into three groups: Mixture(polymer solution) of polymer and organic material having nonlinear optical property; main chain polymer having nonlinear optical property in its main chain; and branched polymer having nonlinear optical property in its side chain.

The polymer solution is produced by mixing polymer matrix with nonlinear optical(hereinafter referred to as NLO) material in solution or molten state, and can be provided with second order nonlinear optical property by poling process. This process has merit in that it can easily produce system having second order nonlinear optical property. But the process has some demerits on the following matter: Considering mutual solubility between polymer matrix and NLO material, in many cases, solubility of organic material to polymer matrix is too low to express SHG in a high efficiency. In case of introducing NLO material, light scattering may be caused due to phase separation. Furthermore, molecules polarized noncentrosymmetrically by poling tend to be rapidly rearranged centrosymmetrically, and thus the stability is badly deteriorated with time.

Examples of polymers wherein light scattering due to phase separation is prohibited and stability with time is improved to some extent by introducing NLO active molecules of high concentration into polymer are branched or main chain polymers in which NLO active molecules are directly bonded through chemical bonding to side chain or main chain. If molecular rearrangement is caused in main chain polymer by poling, total polymer main chain should be rearranged and thus its rate becomes very slow. Therefore, the mainstreams of studies on NLO material concerns branched polymers which can not only be easily polarized noncentrosymmetrically by poling and solubilized easily in solvent but also give diversity on molecular design and synthesizing.

Recently, amorphous branched NLO material has been described in "Chem.Review Vol.94, No.1, 31–75 pp(1994)". Among those branched polymers, polymers exhibiting liquid crystalline or crystalline polymer may cause light scattering. Therefore, the use of the materials for optical devices is largely restricted. As an example of amorphous polymers, amorphous polyacrylate type polymer of the formula(1)

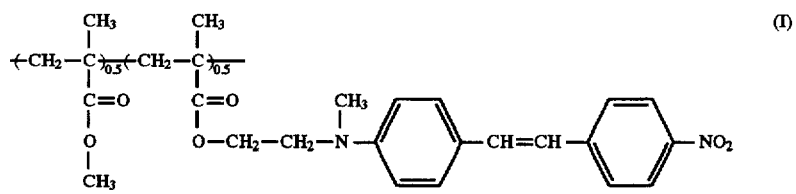

tor industry. In addition to above mentioned processability, the second order nonlinear optical polymer have several having SHG property has been produced by reacting 4-(N-hydroxyethyl-N-methyl)-amino-4'-nitrostilbene with acryloyl chloride and then copolymerizing the resulting monomer with methyl methacrylate, as disclosed in U.S. Pat. No. 4,808,332. However, the stability with time of this material still need to be improved and there continues to be a demand for new polymers. The method of inhibiting the movement within molecule through crosslinking is also known, but the use of this material for optical devices is restricted since crosslinking density is not uniform and thus the transmittance of light decrease badly.

Based on the problems of the above-mentioned studies, the present inventors have made extensive studies in order to solve the problems of known polymers and to find new polymers. As a result, the present inventors have now found that by comparing the structure and physical properties of various kinds of NLO polymers and choosing new polymer wherein functional group feasible to hydrogen bonding and aromatic structure are introduced into polymer skeletal, NLO polymer having good stability with time and second order nonlinear optical property as well as good general physical properties can be obtained. The present invention has been attained on the basis of this finding.

SUMMARY OF THE INVENTION

It is an object of the present invention to provide branched polyamides represented by the formula(2)

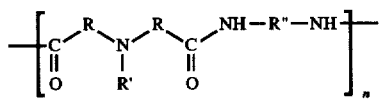
(2)

in which
R is at least one alkylene radical selected from the group consisting of alkylene radicals having 1 to 10 carbon atoms, R' is electron acceptor group represented by the formula (3),

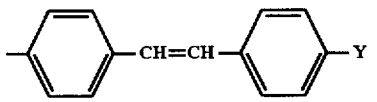
(3)

wherein Y is —C≡N, —NO$_2$, —SO$_2$—R(R=C$_n$H$_{2n+1}$, n=1 to 2 0 alkyl derivatives)

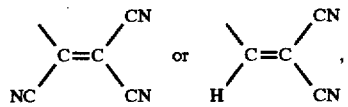

R" is at least one divalent group selected from the group consisting of aliphatic or aromatic divalent group having 2 to 20 carbon atoms, and
n is integer of more than 3,
which have no crystalline area causing light scattering, high glass transition temperature due to hydrogen bonding in polymer skeletal and good temporal stability and also have good second order nonlinear optical property, solubility to organic solvent, film forming property and mechanical strength.

It is a further object of the present invention to provide a method for preparing NLO amorphous polyamides by polycondensation of dicarboxylic acid derivative with diamine monomer.

Other objects and advantages will be apparent to those of ordinary skill in the art from the following description and drawings.

DETAILED DESCRIPTION OF THE INVENTION

The present invention relates to amorphous polyamides having second order nonlinear optical property, and to a method for preparing them.

The amorphous polyamides can be produced by polycondensation of dicarboxylic acid derivative of the formula(I) with diamine monomer of the formula(II)

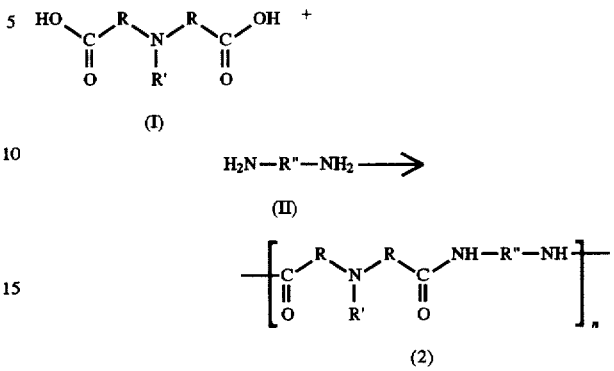

in which R, R', R" and n are as defined above.

Examples of NLO active dicarboxylic acid derivatives which are polymerizable monomers represented by the formula(I) in which R can be methylene, ethylene, propylene, butylene or hexamethylene.

In the diamine monomer(II), representative examples of R" are at least one divalent group selected from the group consisting of

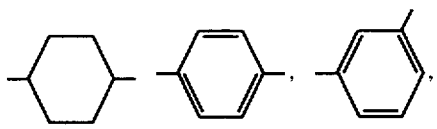

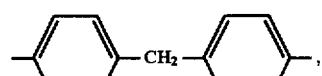

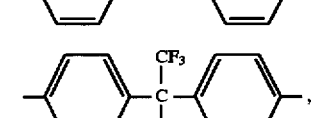

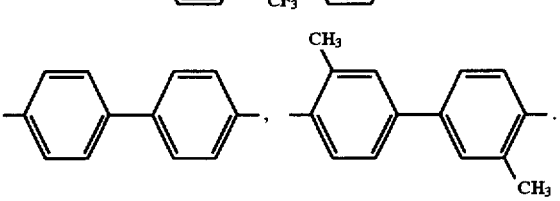

In the present invention, polyamides include homopolymer and copolymer obtained by polycondensation of single or two or more of dicarboxylic acid derivative with single or two or more of diamines.

Polyamides having second order nonlinear optical property according to the present invention have inherent viscosity in the range of 0.05 to 1.80 dL/g and glass transition temperature of 70° C. to 180° C. NLO active polyamides are also easily soluble in aprotic polar solvents such as dimethylsulfoxide, dimethylacetamide, dimethylformamide and N-methyl-2-pyrrolidone. In addition, in case of film forming, there's no problem of cracking or oxidation. That is, the polyamide is in good film state. Furthermore, the polyamide according to the present invention is amorphous polymer characterized by having high second order nonlinear optical property of 50 pm/V or more due to the presence of unit exhibiting NLO property in its side chain, and no crystalline area. The novel polyamide having second order nonlinear optical property can be used for parts of photomodulator, photoswitch and other optical devices owing to its good heat resistance, solubility, film forming property and second order nonlinear optical property.

Now, the present invention will be described more specifically with referenced to examples hereafter, however it should be noted that the present invention is not intended to be restricted within those specific examples.

EXAMPLE 1

Polyamide represented by the formula(4) was prepared by polycondensation of 4-[N,N-bis(2-carboxylethyl)amino]-4'-nitrostilbene(3) with 4,4'-methylenedianiline, as shown in the following reaction scheme:

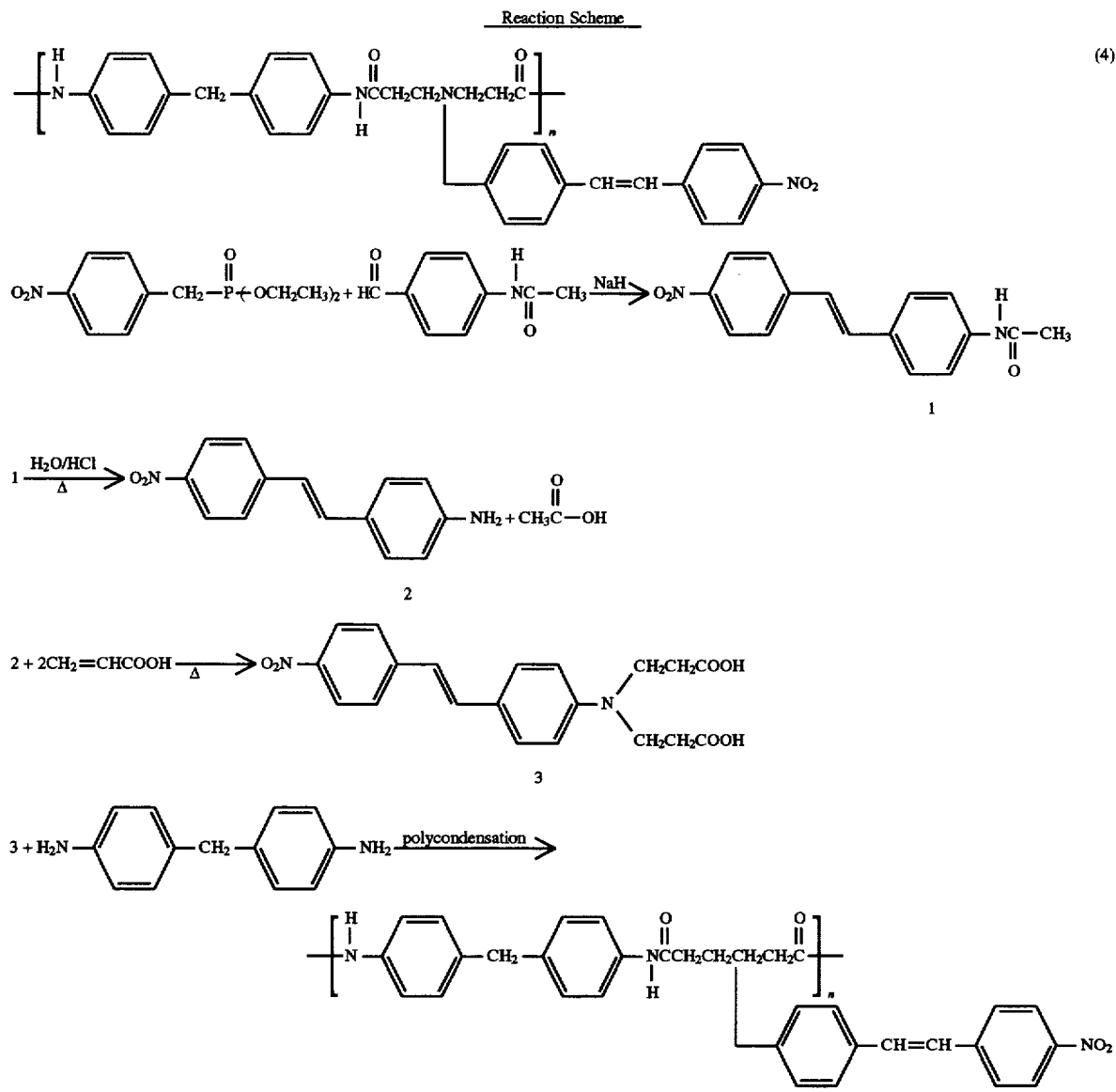

A. Preparation of 4-amino-4'-nitrostilbene(2)

200 ml of dehydrated dimethoxyethane, 27.3 g of pre-prepared diethyl 4-nitrobenzyl phosphonoate and 2.5 g of sodium hydride were charged in 250 ml three-necked flask equipped with a stirrer, a thermometer, a condenser and a dropping funnel. To the flask was added 16.3 g of 4-acetamidebenzaldehyde through funnel while vigorously stirring. After refluxing over 1 hour, the reaction ceased. The reaction mixture was poured into cold water, and the resulting precipitate was filtered and then dried under vacuum. Recrystallization from ethanol gave 26.8 g(yield: 95%) of the product(1). 26.8 g of the obtained product(1) was subjected to hydrolysis in aqueous solution of concentrated hydrochloric acid and ethanol for 6 hours to give 22.8 g(yield: 95%) of desired product(2).

B. Preparation of 4-[N,N-bis(2-carboxylethyl) amino]-4'-nitrostilbene(3)

To 250 ml three-necked flask equipped with a stirrer, a thermometer and a condenser were added 4.8 g(0.02 mol) of 4-amino-4'-nitrostilbene(2, X=NO₂), 36 g(0.5 mol) of acrylic acid and 3 ml of acetic acid and then the internal temperature of the flask was raised to 90° C. After reacting for 24 hours at that temperature, the internal temperature was decreased to room temperature. The obtained precipitate was filtered and recrystallized from acetic acid to give 6.0 g(yield:96%) of dark red product(3).

C. Preparation of Polymer 0.5 g of 4-[N,N-bis(2-carboxylethyl)amino]-4'-nitrostilbene(3), 0.2578 g of 4,4'-methylene dianiline, 1.2 g of triphenyl phosphite(TPP), 0.4 g of lithium chloride(LiCl), 2 ml of pyrimidine and 8 ml of N-methyl pyrrolidone were added to 100 ml two-necked flask equipped with a nitrogen inlet and reacted at 100° C. for 24 hours. After completion of the reaction, temperature was decreased to room temperature and the reaction mixture was poured into water to precipitate polymer. The precipitated polymer was filtered and washed several times with methanol and acetone. The precipitate was filtered and dried under vacuum to give a dark brown polymer. The inherent viscosity as measured on a solution of dimethylformamide at a concentration of 0.5 g/dL at 25° C. was 0.5 dL/g. The yield was 92%.

D. Measurement of the Thermal Property and Optical Property

In order to determine the thermal properties of the polyamide having second order nonlinear optical property according to the present invention, glass transition temperature and thermal decomposition temperature were measured by a differential scanning calorimeter(DSC) and thermogravimetric analysis. Absorbance was measured by UV-vis absorption spectrophotometer. X-ray analysis was carried out to see if crystalline area exist. The test specimen for determining electro-optic coefficient was prepared as follows: Polyamide having NLO active property was dissolved in dimethylformamide in a concentration of 15% by weight and the resulting solution was spin-coated on indium-tin oxide(ITO) glass plate to give thin film of 3 to 5 μm thick. After drying, aluminum thin film was coated on the surface of the plate by vacuum deposition. The specimen was subsequently subjected to poling by applying direct current voltage of 2MV/cm at 170° C. in a specimen thickness direction. Eletro-optic coefficient(δ33) of the specimen wherein poling was completed was determined by using the method suggested by C. C. Teng and H. T. Man in Appl. Phys. Lett. 56(1990), 1734 pp.

EXAMPLE 2

Polyamide represented by the formula(5) was prepared by polycondensation of 4-[N,N-bis(2-carboxylethyl)amino-4'-nitrostilbene(3) with 4,4'-oxydianiline.

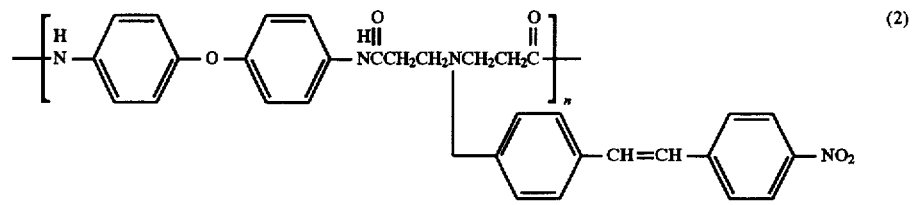

(2)

A Preparation of Polymer

The procedure of Example 1 was repeated except that 4,4'-oxydianiline was used in place of 4,4'-methylenedianiline in C of Example 1. The inherent viscosity as measured on a solution of dimethylformamide at a concentration of 0.5 g/dL at 25° C. was 0.67 dL/g. The yield was 90%.

B. Measurement of Thermal Property and Optical Property

The procedure of D of Example 1 was repeated in order to determine the thermal property and optical property of the polyamide.

EXAMPLE 3

Copolyamide was prepared by polycondensation of 4-[N,N-bis (2-carboxylethyl)amino]-4'-nitrostilbene(3) with mixture of two diamine monomer, i.e. 4,4'-methylene dianiline and 4,4'-oxydianiline mixture.

A. Preparation of Copolyamide

The procedure of Example 1 was repeated except that mixture of two diamine monomer, i.e. 50:50 mol % mixture of 4,4'-methylene dianiline and 4,4'-oxydianiline was used in place of 4,4'-methylene dianiline in C of Example 1. The inherent viscosity as measured on a solution of dimethylformamide at a concentration of 0.5 g/dL at 25° C. was 0.62 dL/g. The yield was 92%.

B. Measurement of Thermal Property and Optical Property

The procedure of D of Example 1 was repeated in order to determine the thermal property and optical property of the copolyamide.

COMPARATIVE EXAMPLE 1

Polyamide represented by the formula(6)

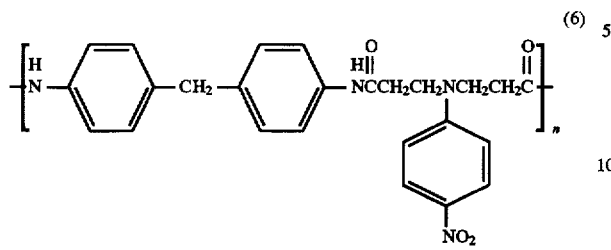

was prepared by polycondensation of N,N-bis(2-carboxylethyl)amino-4'-nitrobenzene with 4,4'-methylenedianiline.

A. Preparation of N,N-bis(2-carboxylethyl)amino-4-nitrobenzene 13.8 g(0.1 mol) of 4-nitroaniline, 72 g(1 mol) of acrylic acid and 3 ml of acetic acid were charged into 250 ml three-necked flask equipped with a stirrer, a thermometer, and a condenser, and reacted at 90° C. for 72 hours. After the reaction, the internal temperature was decreased to give a precipitate. The obtained precipitate was filtered and recrystallized from mixture solvent of ethylacetate and hexane to give 18.9 g(yield:90%) of product.

B. Preparation of Polymer 0.5 g of N,N-bis(2-carboxylethyl)amino-4-nitrobenzene, 0.3966 g of 4,4'-methylene dianiline, 1.2 g of triphenyl phosphite(TPP), 0.4 g of lithium chloride(LiCl), 2 ml of pyrimidine and 8 ml of N-methyl pyrrolidone were added to 100 ml two-necked flask equipped with a nitrogen inlet, and reacted 100° C. for 24 hours. After completion of the reaction, temperature was decreased to room temperature and the reaction mixture was poured into water to give a precipitated polymer. The precipitated polymer was filtered and washed several times with methanol and acetone. The precipitate was filtered and dried under vacuum to give a polymer. The inherent viscosity as measured on a solution of dimethylformamide at a concentration of 0.5 g/dL at 25° C. was 0.71 dL/g. The yield was 85%.

C. Measurement of the Thermal Property and Optical Property

The procedure of D of Example 1 was repeated in order to determine the thermal property and optical property of the polyamide.

COMPARATIVE EXAMPLE 2

Polyamide represented by the formula(7)

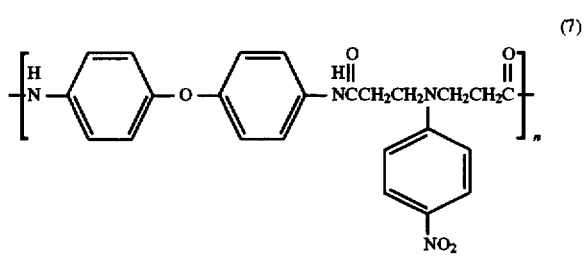

was prepared by polycondensation of N,N-bis(2-carboxylethyl)amino-4-nitrobenzene with 4,4'-oxydianiline.

A. Preparation of Polymer

The procedure of Comparative Example 2 was repeated except that 4,4'-oxydianiline was used in place of 4,4'-methylene dianiline. The inherent viscosity as measured on a solution of dimethylformamide at a concentration of 0.5 g/dL at 25° C. was 0.64 dL/g. The yield was 92%.

B. Measurement of Thermal Property and Optical Property

The procedure of D of Example 1 was repeated in order to determine the thermal property and optical property of the polyamide.

COMPARATIVE EXAMPLE 3

A. Preparation of Polymer

In this Comparative Example, the same polymer of the formula(1) having second order nonlinear optical property was prepared according to the method suggested in U.S. Pat. No. 4,808,332.

B. Measurement of the Thermal Property and Optical Property

The procedure of D of Example 1 was repeated in order to determine the thermal property and optical property of the polyamide.

Table 1 shows the experimental results of the polymer prepared in Examples and Comparative Examples.

TABLE 1

| polymer | inherent viscosity[a] $(\eta_{inh})$(dL/g) | UV-vis spectra | | | X-ray analysis | thermo-analysis | | $\gamma_{33}$[f] (pm/V) |
|---|---|---|---|---|---|---|---|---|
| | | $\lambda_{max}$[b] | $\epsilon$[c] $(mol^{-1}cm^{-1})$ | $UV_{cut off}$ | | $T_g$[d] (°C.) | $DT$[e] (°C.) | |
| Ex.1 | 0.50 | 458 | 47748 | 600 | amorphous | 164 | 230 | 52 |
| Ex.2 | 0.67 | 456 | 23288 | 600 | amorphous | 167 | 230 | 50 |
| Ex.3 | 0.62 | 458 | 37623 | 600 | amorphous | 165 | 230 | 51 |
| Com. Ex.1 | 0.71 | 404 | 14318 | 480 | amorphous | 157 | 240 | 15 |
| Com. Ex.2 | 0.64 | 403 | 19091 | 480 | amorphous | 165 | 240 | 15 |

TABLE 1-continued

| polymer | inherent viscosity[a] ($\eta_{inh}$)(dL/g) | VU-vis spectra $\lambda_{max}$[b] | $\epsilon$[c] (mol$^{-1}$cm$^{-1}$) | UV$_{cut.off}$ | X-ray analysis | thermo-analysis Tg[d] (°C.) | DT[e] (°C.) | $\gamma_{33}$[f] (pm/V) |
|---|---|---|---|---|---|---|---|---|
| Com. Ex.3 | 0.48 | 428 | 43227 | 590 | amorphous | 140 | 265 | 28 |

*footnote)
[a]solvent: dimethylformamide, concentration: 0.5 g/dL
[b]maximum absorption zone in UV-vis spectra
[c]molar absorbance coefficient
$\epsilon$ = A/LC (A: absorbance, L: thickness of UV cell, C: concentration)
[d]Tg: glass transition temperature
[e]DT: initial thermal decomposition temperature
[f]$\gamma_{33}$: Electro-optic coefficient As seen in Table 1, branched polyamides according to the present invention are soluble easily in organic solvent, and reveal high electro-optic coefficient, high glass transition temperature(Tg) of 160° C. or more and excellent temporal stability owing to the presence of hydrogen bonding in the polymer skeletal. Furthermore, they also have good film forming property and mechanical strength.

What is claimed is:

1. An amorphous polyamide represented by the formula (2)

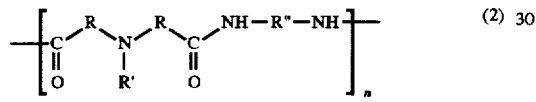

in which
each R is at least one alkylene radical selected from the group consisting of alkylene radicals having 1 to 10 carbon atoms, R' is electron acceptor group represented by the formula (3),

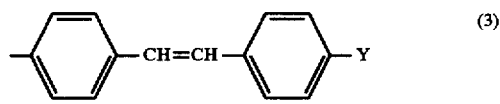

wherein Y is —C≡N, —NO$_2$, —SO$_2$—R(R=C$_n$H$_{2n+1}$, n=1 to 20 alkyl derivatives)

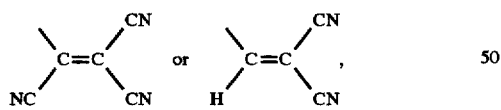

R" is at least one divalent group selected from the group consisting of aliphatic and aromatic divalent groups having 2 to 20 carbon atoms, and n is integer of more than 3.

2. An amorphous polyamide according to claim 1, wherein each alkylene radical R is independently selected, from the group consisting of methylene, ethylene, propylene, butylene and hexamethylene.

3. An amorphous polyamide according to claim 1, wherein aliphatic or aromatic divalent group R" is at least one divalent group selected from the group consisting of

—CH$_2$—, —(CH$_2$)$_2$—, —(CH$_2$)$_3$—, —(CH$_2$)$_4$—, —(CH$_2$)$_6$—,

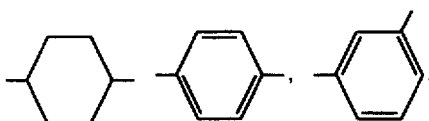

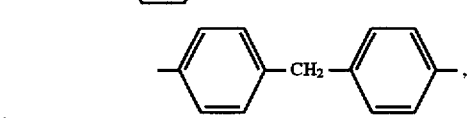

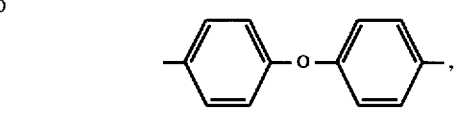

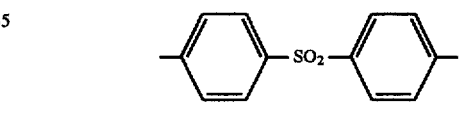

and

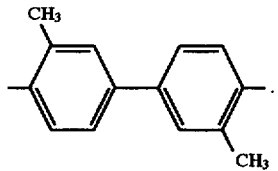

4. An amorphous polyamide according to claim 1 having an inherent viscosity of 0.05 to 1.8 dL/g, as measured in a solution of dimethylformamide at a concentration of 0.5 g/dL at 25° C.

5. An amorphous polyamide according to claim 1 having a glass transition temperature of 70° to 180° C.

* * * * *